Figure 1:
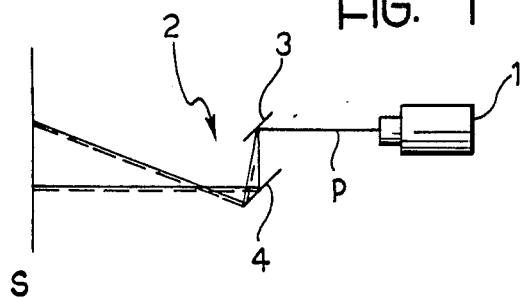

United States Patent [19]

Soardo

[11] Patent Number: 4,868,721
[45] Date of Patent: Sep. 19, 1989

[54] HEADLAMP FOR MOTOR VEHICLES WITH PROGRAMMABLE LIGHT DISTRIBUTION

[76] Inventor: Paolo Soardo, Via Ventimiglia 65, Torino, Italy

[21] Appl. No.: 193,462

[22] Filed: May 12, 1988

[30] Foreign Application Priority Data

May 13, 1987 [IT] Italy ............... 67414 A/87

[51] Int. Cl.$^4$ .............................. B60Q 1/00
[52] U.S. Cl. ..................... 362/80; 362/282; 362/284; 362/324
[58] Field of Search ............ 362/61, 80, 276, 277, 362/280, 259, 263, 281, 282, 283, 284, 301, 319, 322, 323, 324, 66; 350/6.5, 6.6; 315/77.82

[56] References Cited

U.S. PATENT DOCUMENTS

| | | | |
|---|---|---|---|
| 1,416,375 | 5/1922 | Mueller | 362/61 |
| 3,752,408 | 8/1973 | Tixier | 362/276 |
| 4,343,531 | 8/1982 | Tateoka et al. | 350/6.5 |
| 4,638,156 | 1/1987 | Horikawa et al. | 350/6.6 |
| 4,739,223 | 4/1988 | Baba et al. | 315/82 |
| 4,768,135 | 8/1988 | Kretschmer et al. | 362/277 |

FOREIGN PATENT DOCUMENTS 153914 12/1980 Japan ................... 350/6.6

Primary Examiner—Ira S. Lazarus
Assistant Examiner—D. M. Cox
Attorney, Agent, or Firm—Pennie & Edmonds

[57] ABSTRACT

A headlamp for motor vehicles comprises a light source of the type adapted to generate a concentrated unidirectional pencil of light, and a motorized deflector device for intercepting the pencil of light and causing continuous rapid scanning thereof within at least one predetermined solid angle to obtain a light beam of predetermined characteristics.

22 Claims, 4 Drawing Sheets

HEADLAMP FOR MOTOR VEHICLES WITH PROGRAMMABLE LIGHT DISTRIBUTION

The present invention relates generally to motor vehicle headlamps.

More particularly, the invention concerns a motor vehicle headlamp of the type comprising a light source and optical means for distributing the light emitted by the light source in a beam of predetermined characteristics.

As is well known, motor vehicle headlamps must be able to provide the light distributions laid down by international regulations. These distributions correspond essentially to: the main beam (a concentrated light beam), the dipped beam (a more diffuse light beam localized in angular zones so as not to dazzle those travelling in the opposite direction), and the fog beam (a very diffuse light beam contained between two horizontal planes which are close together).

The light sources used in headlamps currently in use are generally constituted by incandescent lamps of various types, and the optical means for achieving the distribution of the emitted light beam are constituted by correspondingly-shaped reflectors, as well as by specific positions of the lamp, by particular screening thereof, and by prismatic dioptric refractors of the rays, etc.

The main problems with known headlamps lie essentially in the need to install a multiplicity of optical units in the vehicle (up to three per side), in the inflexibility of performance due to the invariability of the light distribution for which the headlamp was produced, in considerable dimensional bulk as a result of the need to contain the angular spread and therefore to use reflectors of quite long focal lengths, and finally in production difficulties and problems which are multiplied by the number of units (main beam, dipped beam and possible foglamp) to be installed in the vehicle.

The object of the present invention is to avoid the above problems and, more particularly, to produce a vehicle headlamp of the type specified above which can achieve a spatial distribution of light intensity corresponding selectively to the characteristics of the various prescribed beams (main, dipped, fog).

In order to achieve this object, the subject of the invention is a headlamp for motor vehicles of the type defined at the beginning, characterized in that the light source is of the type adapted to generate a concentrated unidirectional pencil of light, and in that the optical means include at least one motorized deflector device for intercepting the pencil of light and causing continuous rapid scanning thereof within at least one predetermined solid angle to obtain the light beam of predetermined characteristics.

Conveniently, the deflector device is operatively associated with an electronic control unit for programmable variation of the distribution of the light beam.

According to another aspect of the invention, a device for modulating the intensity of the pencil of light is operatively associated with the light source and controlled by the electronic control unit.

Compared with conventional headlamps, the headlamp according to the invention has the advantage of being able to produce the three light distributions corresponding to the main, dipped and fog beams selectively and equally well, as well as of permitting programmable variations of the light distribution within the range of each beam. Amongst other things, therefore, the invention enables the front of the motor vehicle to be equipped on each side with a single optical device which has two or three functions, and which is compact and of a considerably simplified structure.

To advantage, the light source of the headlamp according to the invention is constituted by at least one laser generator or, alternatively, by a light emitter of the electrical-arc or other suitable type adapted, for example, to generate a pencil of light having an angular amplitude in the vertical plane of the order of one hundredth of a radian and in the horizontal plane of the order to 2–3 hundredths of a radian.

The device for deflecting the pencil of light includes at least one angularly movable reflecting surface with various configurations as specified below.

The invention will now be described with reference to the appended drawings, provided purely by way of non-limiting example, in which:

FIG. 1 is a diagrammatic side elevational view which shows the essential components of a motor vehicle headlamp according to a first embodiment of the invention.

Figure 2:
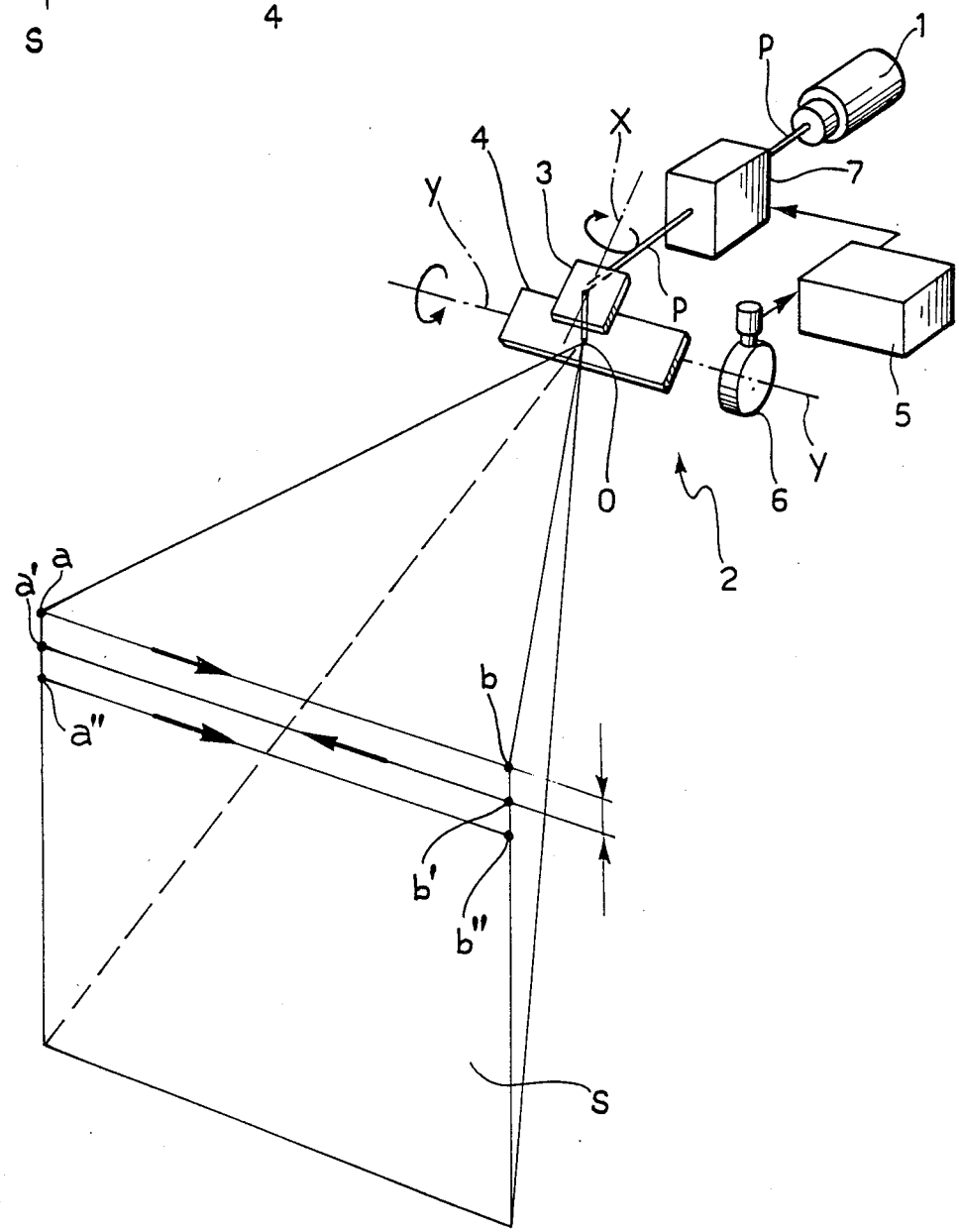
Figure 3:
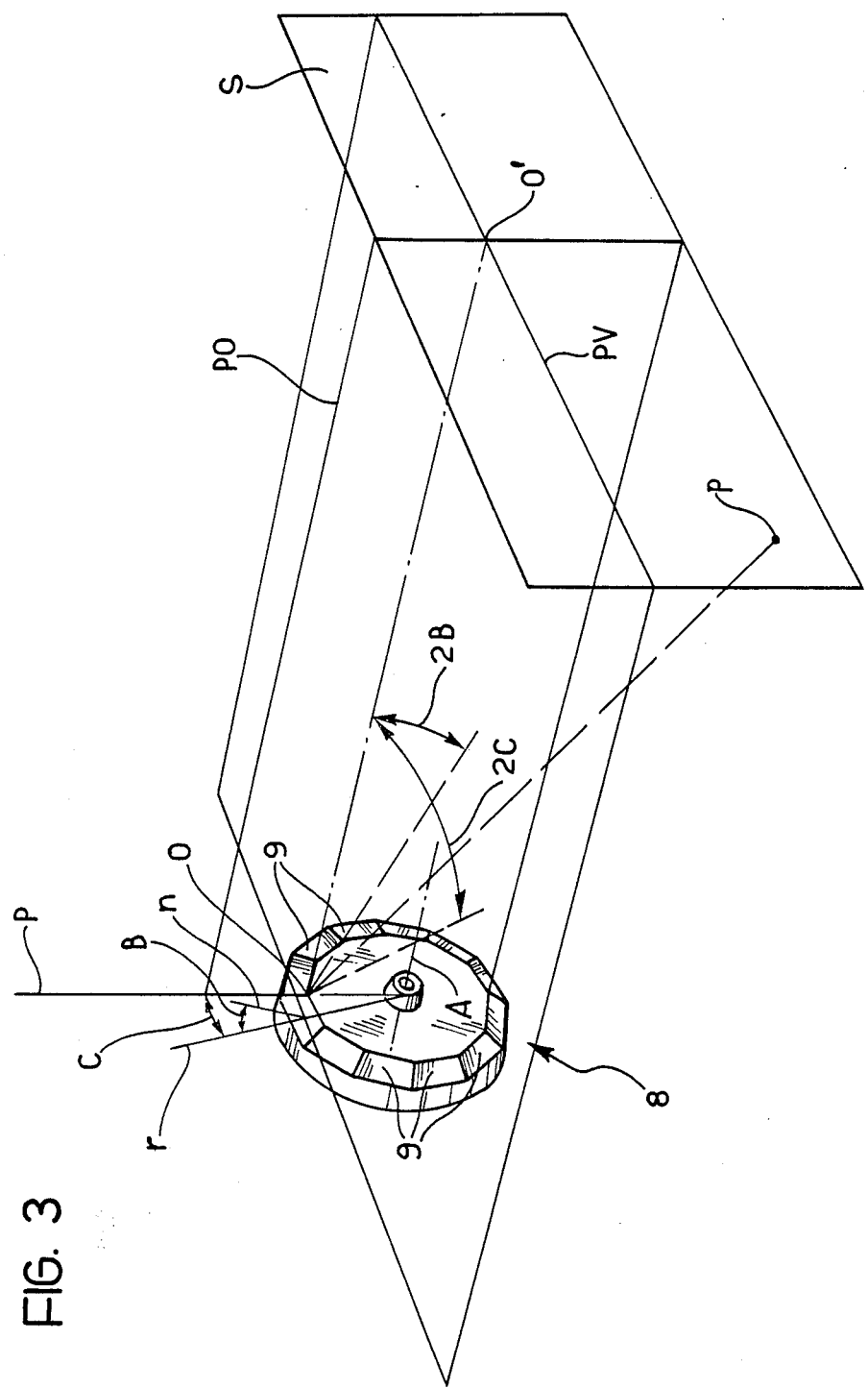
Figure 5:
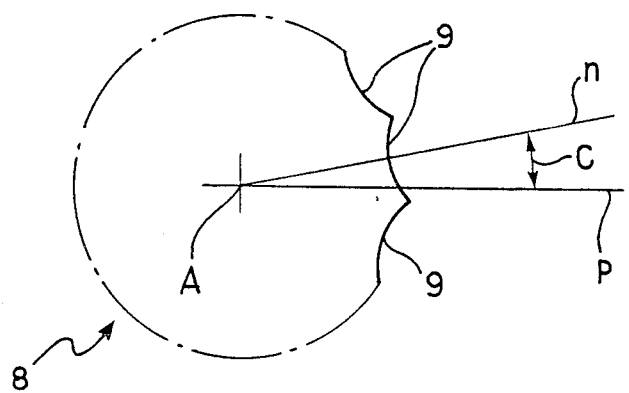
Figure 6:
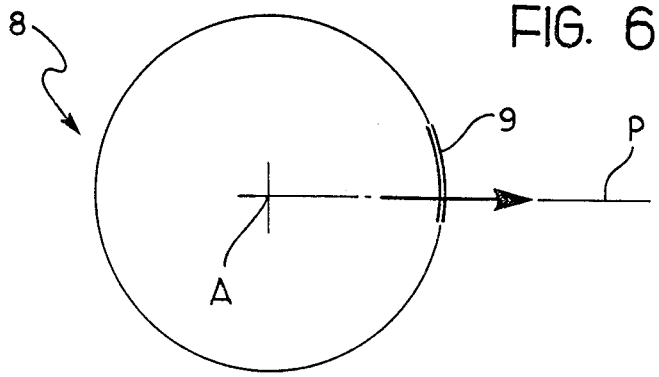
Figure 8:
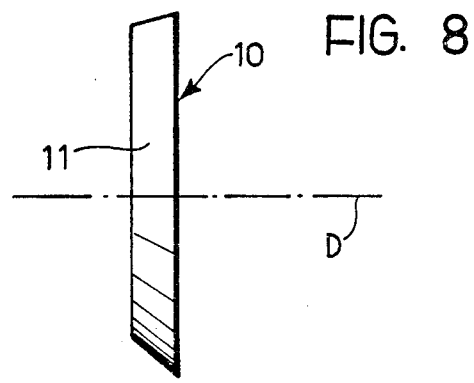
Figure 7:
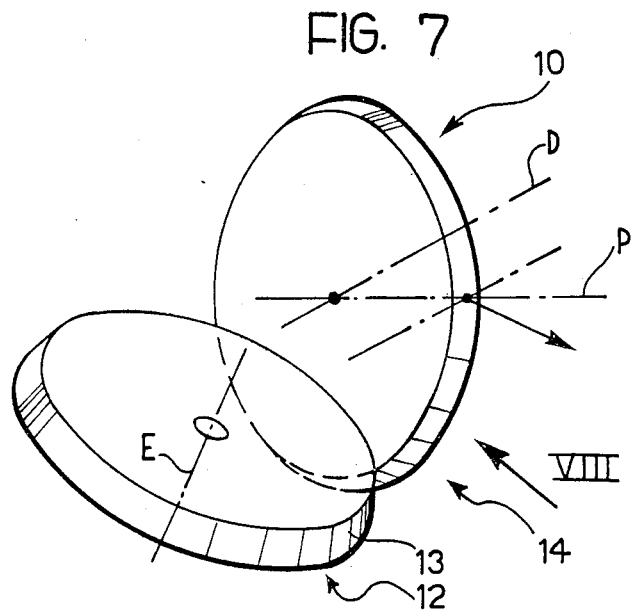
Figure 9:
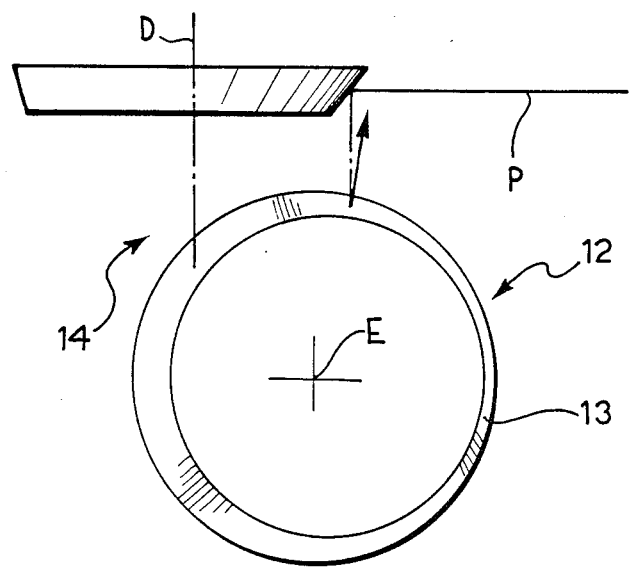

FIG. 2 is a schematic perspective view which shows all the operative components of the headlamp of FIG. 1 and demonstrates the principle of their operation, FIG. 3 is a schematic perspective view which shows a variant of a component of the headlamp according to FIGS. 1 and 2, FIGS. 4 to 6 are three schematic front elevational views of alternative variants of FIG. 3, FIG. 7 is a schematic perspective view of a further variant of FIG. 3, FIG. 8 is a side elevational view taken on the arrow VIII of FIG. 7, and FIG. 9 is an elevational view of a further variant of FIG. 3.

In general, the main difference between the headlamp of the invention and conventional headlamps lies in the fact that, while the latter emit a light beam simultaneously in all the required directions, the former uses a light source of the type adapted to generate a concentrated unidirectional pencil of high-intensity light. By way of example, this pencil of light should conveniently have a general angular amplitude of the order of one hundredth of a radian. Preferably and more conveniently, it should have different angular amplitudes in the vertical and horizontal planes (with reference to the position in which the headlamp is mounted on the motor vehicle), of the order of one hundredth of a radian and of 2–3 hundredths of a radian, respectively.

The characteristics of illumination of the light source must be such as to ensure a luminous-flux intensity which is generally equal to that obtained by conventional headlamp bulbs, that is, of the order of 500 lumens.

The preferred light source according to the invention for obtaining such a pencil of light is constituted by a laser generator, schematically indicated 1 in FIGS. 1 and 2. The laser generator may be replaced, however, by a suitable light source of the electrical-arc type or even of the filament type.

In every case, the generator of the pencil of light is operatively associated with a motorized deflector system adapted to cause continuous rapid scanning within a solid angle which is predetermined in dependence on the characteristics of the light beam which corresponds to the required distribution (main, dipped, fog). The scanning rate must be such that the pencil of light illuminates all the points of the surface section of the cone corresponding to the predetermined solid angle in quick succession, and in any case such as to ensure the phenomenon of persistence of vision of the light beam.

In the case of FIGS. 1 and 2, the system for deflecting the pencil of light generated by the laser 1, indicated P, is generally indicated 2 and comprises two plane mirrors 3, 4.

The first mirror 3 is arranged in the path of the pencil of light P and is pivoted about a central axis X. The mirror 3 is inclined to the axis of the pencil of light P so as to deflect it towards the second mirror 4 which is pivoted about a central axis Y perpendicular to the axis X and to the axis of the pencil P.

The two mirrors 3 and 4 are operated by a motorized device which causes their alternating oscillation about the respective axes X and Y, in a synchronized manner. This motorized device is not illustrated for simplicity of the drawings, since it is within the capability of an expert in the art: it may, in fact, be constituted by an electric motor whose shaft is operatively connected to the two mirrors, for example, through respective cranks or equivalent mechanisms.

An electronic control unit 5 is associated with the deflector system 2 and is conveniently constituted by a programmable microprocessor which is supplied with electrical signals produced by a detector 6 constituted, for example, by an encoder, and indicative of the angular position of one of both of the mirrors 3 and 4, and thus indicative of the angular spatial position of the deflected pencil of light P.

The output of the electronic unit 5 is connected to a modulator 7 by means of which the intensity of the pencil of light P emerging from the emitter 1 is modulated. In the case of the embodiment illustrated, in which the emitter 1 is constituted by a laser generator, the modulator 7 is constituted by a piloting circuit of conventional type for lasers When different types of light source are used, the modulator 7 may alternatively be constituted by an optical or mechanical filter, for example a liquid crystal, by an iris or rotary diaphragm, or by other equivalent systems.

In operation, the continuous alternating angular movement imparted to the mirrors 3 and 4 produces, as stated, a rapid scanning of the pencil P within a half-space defined by a cone whose vertex is approximately at O. By the suitable arrangement of the two angles of rotation of the mirrors 3 and 4 about the respective axes X and Y, it is possible to cause the pencil P to be directed along any one of the straight lines of the beam passing through O and delimited by a solid angle which is defined structurally in dependence on the maximum values assumed by these two angles With reference to FIG. 2, the synchronization of the oscillating movement of the two mirrors 3 and 4 is such as to cause a movement of the pencil P, which starts from one of the vertices (for example, that indicated a) of the section S of the half-space, follows, for example, the horizontal path from to b, then descends to b', follows the horizontal path from b' to a', descends to a'', then travels the section a'' to b'', and so on.

The field to be illuminated is thus covered by the succession of "lines" (for example, horizontal) whose speed is, as stated, sufficiently high to make use of the phenomenon of persistence of vision.

The luminous intensity of the pencil P is modulated by means of the piloting signals sent to the modulator 7 by the electronic unit 5 in response to signals provided by the detector 6.

It will easily be understood that, with suitable modulation (for example, by means of programs memorized by the processor 5) of the intensity of the pencil, all the possible light distributions may be obtained with a spatial intensity between O and a maximum value.

This enables not only selective switching of the various light distributions corresponding to the main, dipped and fog beams, but also the variation of the geometric characteristics and/or the intensity of each of these beams, to obtain, for example, more or less concentrated main beams, "wider" or "narrower" dipped beams, and more or less penetrating fog beams.

FIGS. 3 to 9 illustrate various possible variants of the deflector system of the headlamp, the other essential components described above remaining the same, except for details which will be explained from time to time.

In the case of FIG. 3, the pencil P falls on the lateral surface of a cylindrical body 8 which is rotatable about its own horizontal axis A. The lateral surface of the cylindrical body 8 has a circumferential ring of contiguous reflective faces 9 which, due to the rotation of the body 8, successively intercept the pencil of light P.

This rotation is caused continuously by means of a motorized device, not illustrated for simplicity, but within the capability of an expert in the art: this device may include, for example, an electric motor having a rate of rotation which is fixed or variable by means of programs memorized by the processor 5, and operatively connected thereto.

In the case of FIG. 3, the reflective faces 9 are flat and converge towards the axis A of the body 8 with different inclinations represented by the angle B between the normal n to each face 9 and the radius r of the body 8 which passes through the point of intersection of the normal n and the face 9.

Clearly, during rotation of the body 8, each reflective face 9 intercepts the pencil of light P at a variable angle of incidence C.

It can easily be seen that, by virtue of the angle B, the light reflected by the face 9 which intercepts the pencil P from time to time will be directed in the plane PV passing through 0 (the point of intersection between the pencil P and the reflective face 9) and forming an angle 2B with the axis 00', while, by virtue of the angle of incidence C, the pencil P will also be deflected into the plane PO forming an angle 2C with the axis 00'.

The pencil P will thus fall on a point p of the reference and measuring plane S.

Figure 4:
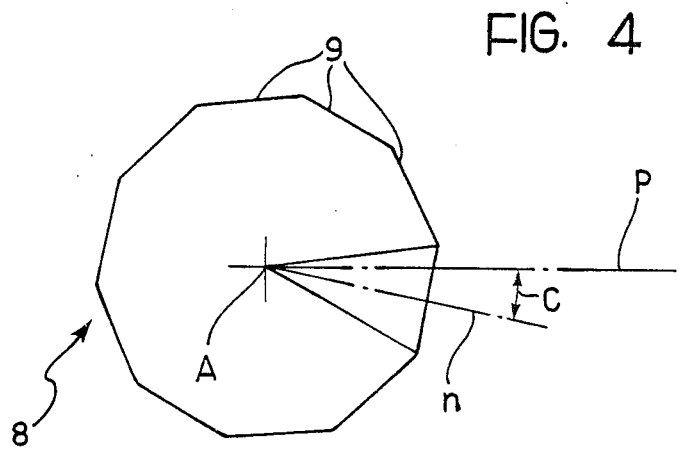

It will be understood that, while the angles B are, for example, in an increasing sequence so as to send the pencil P to parallel and successive lines (for example, horizontal) of the plane S, the angle C may very readily be varied, as illustrated, for example, in FIGS. 4, 5 and 6.

In the case of FIG. 4, which actually corresponds to the configuration of FIG. 3 (flat reflective faces 9), the angle of incidence C varies linearly.

In the case of FIG. 5 (concave reflective faces 9), the angle of incidence C depends on the orientation of the normal n to the face 9 at the point of incidence of the pencil P.

FIG. 6 shows the case in which the body 8 has a circular lateral reflective surface 9 with its center on the axis A: in this case, the pencil P is not displaced in accordance with the angle of incidence C, in other words 2C equals O.

By the combination of these and other types of reflective surface, the scanning of the pencil P may be effected at a variable rate, at the limit of which the pencil P remains steady for a certain time.

It should be noted that, with this solution, a certain number of rotary bodies 8 having specific reflective surfaces may be used axially beside each other: various light distributions may be obtained by an axial displacement of the selected body so that the pencil P falls thereon. This embodiment lends itself, moreover, to operation without the need for the light-intensity modulator 7.

In the case of FIGS. 7 and 8, the deflector system is generally indicated 14 and comprises a first disc 10 rotatable about its own axis D and having a conical lateral reflective surface 11 with a continuously variable angle, as clearly shown in FIG. 8. In practice, this surface 11 corresponds to an oblique section of a cone.

The surface 11 is adapted to intercept the pencil of light P and reflect it onto the reflective lateral surface 13 of a second disc 12 rotatable about its own axis E which is at an angle to the axis D. The lateral reflective surface 13 of the second disc 12 may have a similar conformation to that of the lateral surface 11 of the first disc 10, or it may be faceted as in the case of FIGS. 3 to 6. In the first case, the two discs 11 and 12 are rotated continuously (by means of a motorized device not illustrated, but within the capability of an expert in the art) so that the rate of rotation of the second disc 12 is equal to a multiple of that of the first disc 10, this multiple depending on the number of "lines" which must be travelled by the pencil of light P.

In this solution, the light-intensity modulator 7 must also be associated with the generator 1 of the pencil of light P.

It should be noted that it is envisaged that the various deflector systems described above may be combined with each other interchangeably so as to provide the various spatial distributions required for the prescribed light beams, and that in each case the distribution of the individual beams may be varied at will in a programmed manner by means of the electronic control unit 5. Furthermore, it is also possible to use more than one light source, even of different types.

Naturally, the details of construction and forms of embodiment may be varied widely with respect to those described and illustrated, without thereby departing from the scope of the present invention.

I claim:

1. A motor vehicle headlamp comprising a light source and optical means for distributing the light emitted by the light source in a beam of predetermined characteristics, wherein the light source is of the type adapted to generate a concentrated substantially unidirectional pencil of light, and the optical means include at least one motorized deflector device for intercepting the pencil of light and causing continuous rapid scanning thereof within at least one predetermined solid angle to obtain the light beam of predetermined characteristics.

2. A headlamp according to claim 1, wherein an electronic control unit is operatively associated with the motorized deflector device for programmable variation of the distribution of the light beam.

3. A headlamp according to claim 2, wherein a device for modulating the intensity of the pencil of light is operatively associated with the light source, and is controlled by the electronic control unit.

4. A headlamp according to claim 1, wherein the light source comprises a laser generator.

5. A headlamp according to claim 1, wherein the light source is of the discharge type.

6. A headlamp according to claim 1, wherein the light source is of the filament type.

7. A headlamp according to claim 3, wherein the light source comprises a laser generator and the modulator device is constituted by a piloting circuit of the laser generator.

8. A headlamp according to claim 3, wherein the modulator device is constituted by an optical filter.

9. A headlamp according to claim 3, wherein the modulator device is constituted by a mechanical filter.

10. A headlamp according to claim 3, wherein it further includes means for detecting the spatial position of the pencil emitted by the deflector device, which are operatively connected to the electronic unit for controlling the modulator device.

11. A headlamp according to claim 1, wherein the motorized deflector device causes the pencil of light to scan at a rate sufficient to ensure persistence of vision of the light beam.

12. A headlamp according to claim 1, wherein the deflector device includes at least one angularly movable reflective surface.

13. A headlamp according to claim 12, wherein the deflector device includes a first mirror situated in the path of the pencil of light and pivoted about a first axis, a second mirror arranged on the path of reflection of the pencil of light from the first mirror and pivoted about a second axis perpendicular to the first, and means for moving the first and second mirrors in a continuous angular reciprocating motion, in synchronism with each other.

14. A headlamp according to claim 12 wherein the deflector device includes at least one cylindrical body rotatable about its own axis and having a circumferential ring of contiguous reflective faces which converge towards the axis of the body with different inclinations and are adapted to intercept the pencil of light at an angle of incidence which is variable due to the rotation of the body.

15. A headlamp according to claim 14, wherein the reflective faces are flat.

16. A headlamp according to claim 14, wherein the reflective faces are concave.

17. A headlamp according to claim 14, wherein the reflective faces are convex.

18. A headlamp according to claim 12, wherein the deflector device includes a first disc rotatable about its own axis and having a conical lateral reflective surface with a continuously variable angle for intercepting the pencil of light, and a second disc rotatable about its own axis, which is at an angle with the axis of the first disc and having a lateral reflective surface arranged on the path of reflection of the pencil of light from the first rotary disc.

19. A headlamp according to claim 18, wherein the lateral reflective surface of the second rotary disc has a similar conformation to that of the first disc, and the rate of rotation of the second disc is equal to a multiple of that of the first disc.

20. A headlamp according to claim 18, wherein the lateral reflective surface of the second rotary disc is faceted.

21. A headlamp according to claim 1, wherein the pencil of light has different angular amplitudes in the vertical plane and the horizontal plane, of the order of one hundredth and of 2-3 hundredths of a radian respectively.

22. A headlamp according to claim 1, wherein the pencil of light has a luminous-flux intensity of the order of 500 lumens.

* * * * *